United States Patent

[11] 3,618,787

[72] Inventors Kenji Nemoto
Tokyo;
Masaru Nakajima, Chiba, both of Japan
[21] Appl. No. 11,708
[22] Filed Feb. 16, 1970
[45] Patented Nov. 9, 1971
[73] Assignee Seiko Seiki Kabushiki Kaisha
Tokyo, Japan
[32] Priority Feb. 17, 1969
[33] Japan
[31] 44/11089

[54] FINE BAR FEEDER FOR AUTOMATIC BAR MACHINE
1 Claim, 9 Drawing Figs.
[52] U.S. Cl. .................................................. 214/1.5,
82/2.7
[51] Int. Cl. .................................................. B65h 5/16

[50] Field of Search .................................... 214/1.1–1.5;
82/2.7, 9 B, 914

[56] References Cited
UNITED STATES PATENTS
2,746,128 5/1956 Barron et al. ................. 214/1.4 X
3,272,040 9/1966 Lechot .......................... 214/1.2 X Primary Examiner—Gerald M. Forlenza
Assistant Examiner—Frank E. Werner
Attorney—Blum, Moscovitz, Friedman & Kaplan ABSTRACT: A fine bar feeder for an automatic bar machine wherein the bar material is fitted with a finger and housed in a feeding tube. The feeding tubes carrying the bar material are fed from a cartridge to a feeding position. A pusher rod pushes the rear portion of the bar through the finger block into alignment with feed rollers which are operative to feed the bar to the bar machine and to discharge the remaining unused portion of the bar.

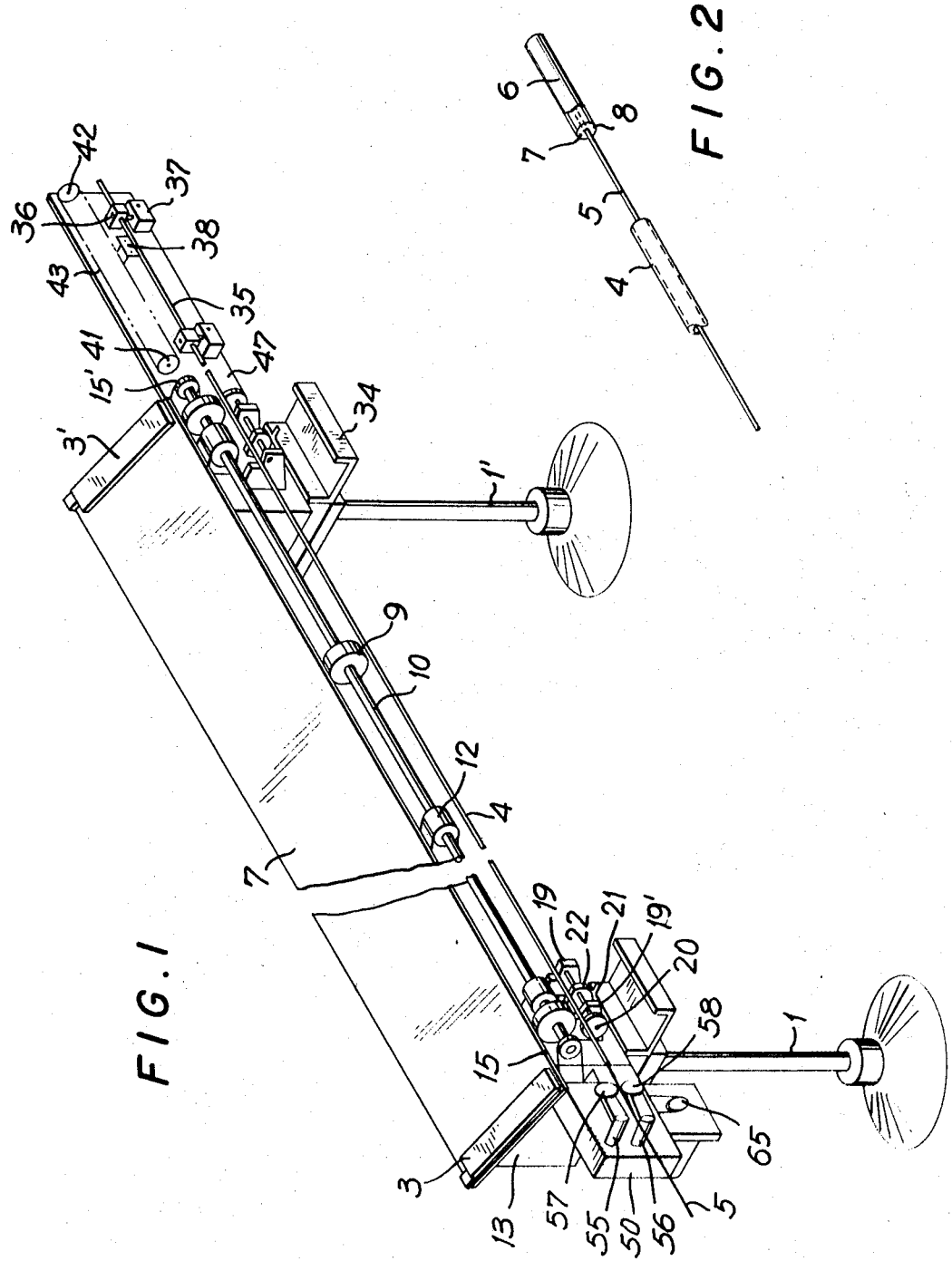

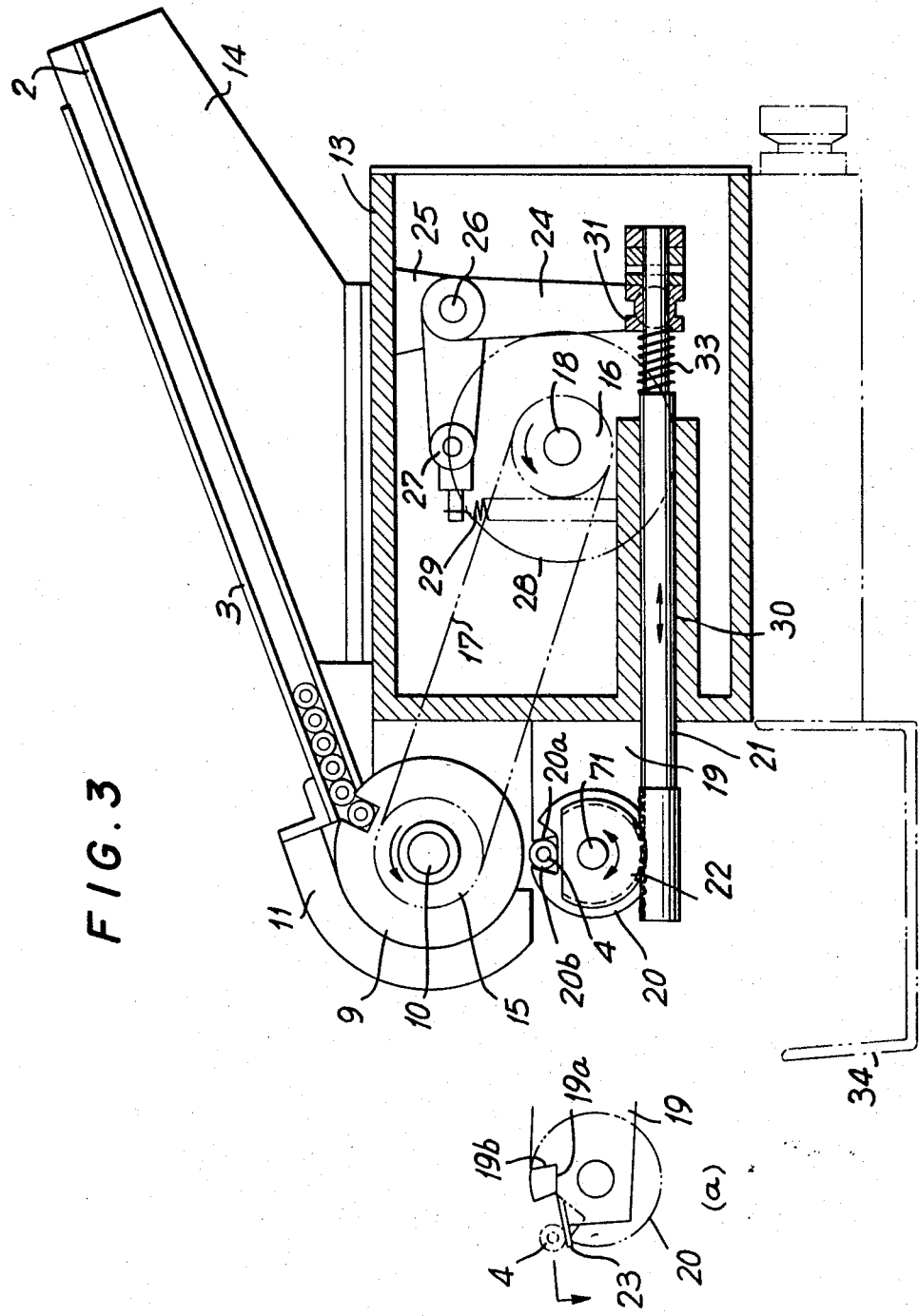

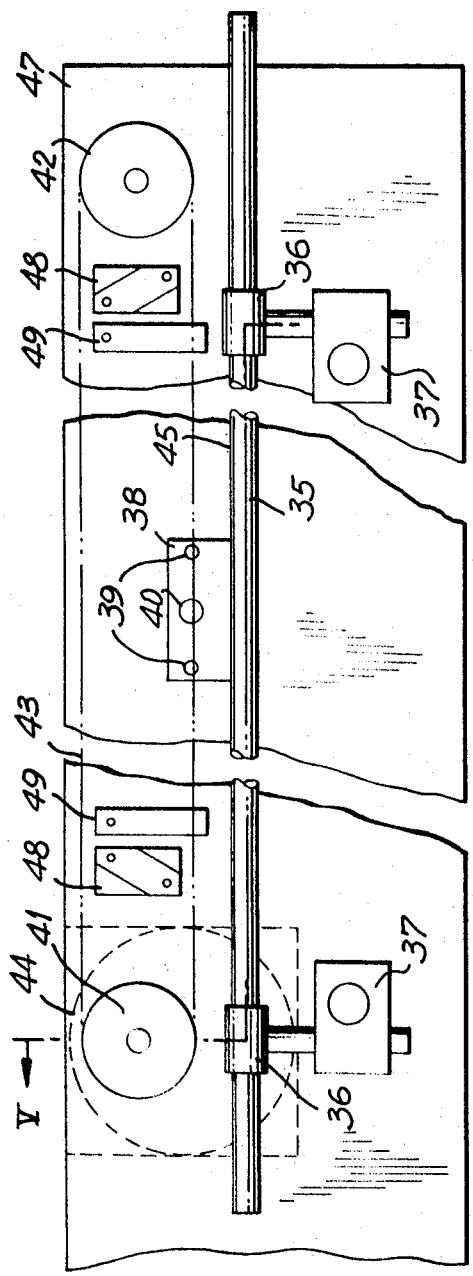
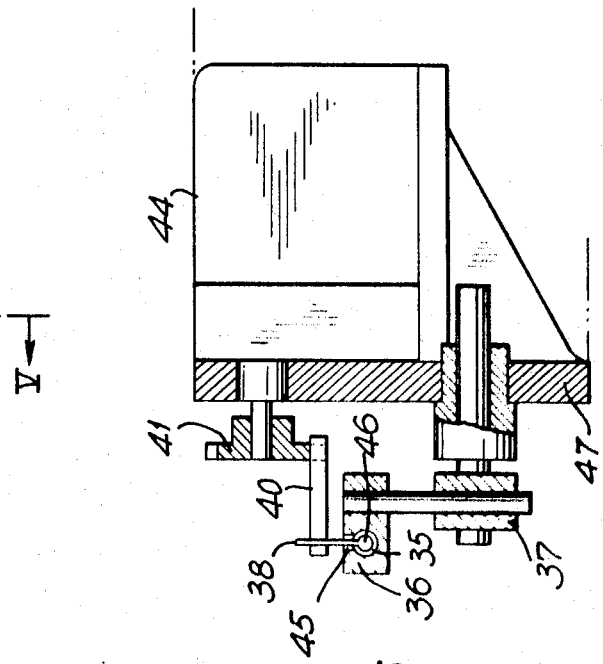
FIG. 4
FIG. 5

FINE BAR FEEDER FOR AUTOMATIC BAR MACHINE

BRIEF EXPLANATION OF THE DRAWINGS

The drawings show an embodiment of this invention.

FIG. 1 is a perspective drawing showing the entire view of the bar feeder;

FIG. 2 is an explanatory drawing of the cartridge-type material feeding;

FIG. 3 is a cross-sectional view of the feeder tube and clamp mechanism; (a) showing the details of the discharging mechanism of feeder tube;

FIG. 4 is a side view of the first transmitting means for bar material;

FIG. 5 is a cross-sectional view cut along V—V in FIG. 4;

DETAILED EXPLANATION OF INVENTION

Figure 6:
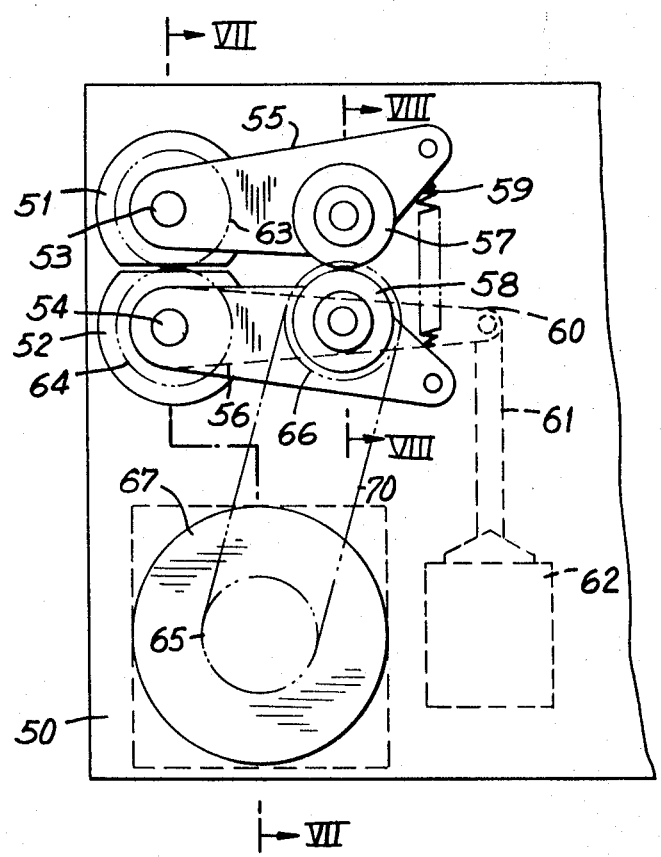
FIG. 6 is a side view of the second transmitting means for bar material.
Figure 7:
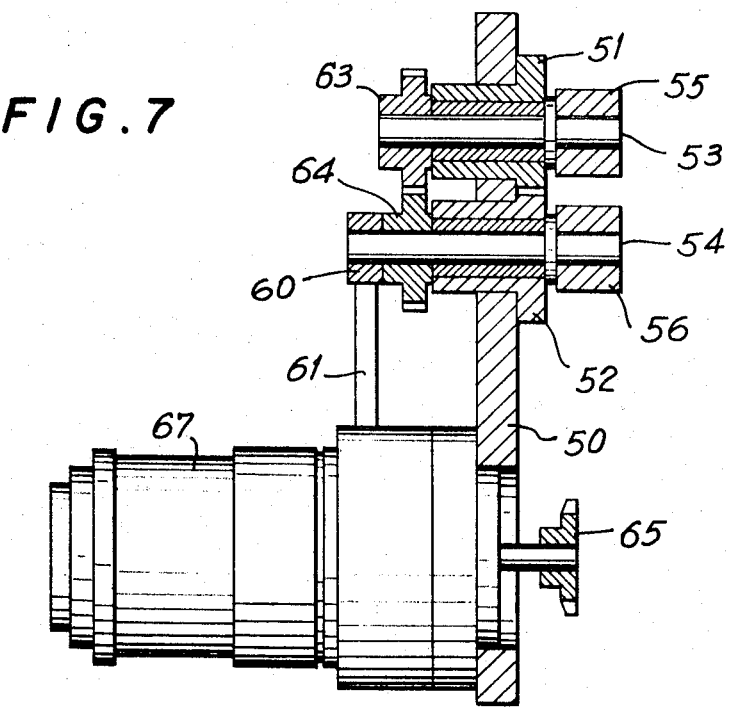
FIG. 7 is a cross-sectional view cut along VII—VII in FIG. 6.
Figure 8:
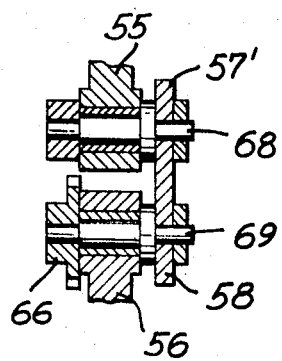
FIG. 8 is a cross-sectional view cut along VIII—VIII in FIG. 6.

This invention relates to a fine bar feeder for an automatic bar machine, especially an automatic bar machine with slidable spindle head, the so-called Swiss-type automatic bar machine, to make the machine automatically operate with high efficiency and high accuracy.

Heretofore such a machine has been composed of a combination of the following well-known principal sections or portions:

The first is the section for taking the required bar materials one by one from the bar stocking place and putting them on the specified feeding axis. There are several means, i.e., (a) one of the bar materials, placed on the bottom of an inclined magazine, is moved with a pair of claws which act coordinately and alternately to release the bottommost of the bar materials and lower same lowered by its own weight; (b) the bar materials are taken away by the rotation of disks having slots according to the size of the bar material; and (c) a rotary drum is provided on which several tubes containing the bar materials as a magazine are arranged cylindrically, the drum being rotated so as to put the tubes containing the bar materials on their specified positions successively in alignment with the feeding centerline for removal from said tubes.

The second section is for feeding the said bar on the said axis to the cutting place of the automatic bar machine and is usually constructed in such a way that a pushing device, movable along the feeding axis, is provided in a guide device at the rear side of the spindle head so as to push the bar material from its rear end.

Lastly, the third section pulls back the unused remainder of the bar material, that is, the rear portion of the bar after machining, toward the rear side of the spindle. The automatic bar machine with slidable spindle head is so constructed that the bar is held to rotate in a jig (guide bush) inserted between the spindle head and the tool, so that the unworked end portion of the bar must consist of a comparatively large length, that is, at least equal to the distance between the chuck of the spindle head and the jig. At any rate, the distance is longer than the stroke of the sliding head along the axis, making it impossible to push out the remainder with a new bar over the jig toward the front side of the spindle; and therefore the construction of pulling back the remainder must be one of the important elements for such an automatic bar feeder.

An example of construction of this section which is well known at present is that at the end of the pushing rod there is formed a special finger clamp, that is, two resilient arms, having inner spots, which are engaged with the preworked small-sized grooved portions of the bar end at the time of the push-feeding step. At the end of the pullback step, the outer tube of the doubly constituted guide tubes is rotated to form an opening gate, after which the remainder is released and falls out due to its own weight, a new bar being received from the upper magazine section successively in the said guide tubes.

In another example of this section a plate for engaging and disengaging is mounted at the end position of pulling back, and the bar material or remainder coming to this position is positioned on the plate by means of engaging and disengaging claws, the said claws engaging and disengaging between the bar end and the finger clamp provided on the end of the push rod according to the forward and backward stroke of the said rod.

All of these prior art techniques of bar feeding for automatic bar machines have disadvantages in common. In the case of bar materials of small diameter (below 0.8 mm.), the feeding becomes too unstable to be put into practice. When the back end of the bar is pushed to guide the front end to the specified machining position, the resistance of the jig (guide bush), etc., must be overcome by the push rod, and the distance between the pushing position and the resistance-actuating positions, as at the jig, etc., becomes maximum when a new bar material is fed. If the bar is of small diameter, deflection and bending in the bar results. When this occurs (the guide tube that has received the bar being provided with an opening to admit the entrance of a new bar and a slot for feeding the pushing rod) bars of small diameter get out of positions, so that it is not only impossible to put the end of a small bar in the specified working position, but also the position where the chuck of the working spindle clamps the bar is displaced by its defection, if not by bending, and a lengthwise deviation of the worked product results, thus making it impossible to obtain an accurate operation. Moreover, the process of engaging and disengaging the bar by the finger clamp in pulling back the bar cannot be performed precisely, and if the expected engaging and disengaging fails even once, the function of the device as an automatic feeder must be discarded.

This invention offers a fine bar feeder for an automatic bar machine capable of feeding even a small diameter bar by eliminating such defects as mentioned above. Specifically the bar is provided with a finger block secured at its rear end or a convenient bar for temporary use as a connecting leg is joined to the push end by welding. Each bar is housed in a feeding tube said bar and feeding tube being fed from a cartridge case to the feeding position through a drum from the magazine chute, the feeder tube then being clamped at that position. Next, the bar is pushed out by a pushing rod engaging the finger and housed in the guide device at the rear side, and the bars front end is sent as the first step to a position adjacent the feed roller positioned nearest to the front end of the feeder. The bar is then sent to the bar machine successively as the second step by the feed roller at the front end. When the machining of one bar has been finished, the feed roller at the end rotates reversely and the remainder is pulled back into the feeding tube together with the finger block, and the clamp of the tube is released to allow the remainder to be discharged with its tube.

Since this invention has a combined construction feeding tube, push rod, and feed roller, as mentioned above, the distance between the roller portion which applies the feeding force and the jig portion which actuates the resistance is minimized, and the value of the said distance is kept constant during all machining cycles, so that the deflection produced is always maintained at a definite small value.

Moreover, the feeding tube is perfectly closed, without any slot, so that it is characterized in such a way that there is no risk of escape of the bar to the outside through the said slot, and a complicated mechanism for the pull back of the remainder such as engaging and disengaging a finger clamp is not needed, which enables us to have a simple and steady automatic bar machine at low cost.

In the following an embodiment of this invention will be explained.

FIG. 1 is a perspective drawing showing the whole view of the bar feeder, in which 1 and 1' are a pair of stands supporting a housing 13 and provided with a finely adjustable mechanism for vertical and horizontal alignment not shown in the figure for bringing the central bar feed axis into coincidence with the work spindle axis. 2 is a magazine chute leaning down toward the feed axis mounted on the housing 13 through a footplate 14 (cf. FIG. 3). The feeder tubes 4 are arranged and set as shown in FIG. 3. Each one of the bars 5 is provided with finger block 6 at the rear end of the said bar, the said block being formed with slightly smaller size holes the bar size and across-centered slit 8 on its end face and being resiliently engaged with the rear end of the said bar. At both ends of chute 2 are fixed fence plates 3 and 3' to prevent the feeder tube 4 from floating up.

The construction of the mechanism of feeding, clamping, and discharging of the feeder tube 4 is next explained, by particularly referring to FIG. 3. At the upper part of the center line of feed at the front under portion of the chute 2 and in parallel to the center line, a rotary shaft 10 is rotatably supported by several bearings 12 mounted on the sidewall of the housing 13. Several drums 9 are secured on the said shaft 10, and a longitudinal slot is formed on the outer surface of each one of these said drums, so that when the slot comes just beneath the lowest feed end of chute 2 by rotating the drum 9, the slot can receive one of the lowest tubes on the chute. Pulleys 15, 15' are secured on both ends of shaft 10, which are connected through belts 17, 17' to pulleys 16, 16' secured respectively on a cam shaft 18 supported in parallel inside the housing 13, and the drum 9 can be rotated by driving the cam shaft with a power source not shown in the figure. On the outer circumference of drum 9, a guide cover 11 is provided to prevent falloff of the feeding tube 4 when the drum 9 is rotated with the feeder tube in its slot. In this way it is able to make the feeder tube fall down on the feed axis by the rotation of the drum from the chute 2.

Next the construction of the following functions will be mentioned. When the feeding tube 4 falls down on the feeding axis, it is received and clamped to coincide with the said axis, and is also released from clamping and discharged together with its bar remainder after the completion of feeding and pulling back with the said bar remainder. Since these mechanisms are provided as a pair along the rotary shaft 10 at its front and rear end portions, the explanation is given for one of them.

At the lower part of the feeding axis a clamping shaft 71 is rotatably supported between two stationary clamping members 19, 19' secured on the sidewall of the housing 13 in parallel with the rotary shaft 10, the said members are cut off at their upper portions and their horizontal portions 19a, 19a' have a height to receive the dropping feeding tube 4 so as to make its center coincide with the feeding axis. A movable clamping member 20 is secured at one end of the clamping shaft 71, the upper portion of the said member being provided with a cut-in slot to receive the feeder tube, the bottom line 20a being at a height to be coincident with the cutoff portions 19a, 19a' of the stationary members 19, 19', and the side line 20b of the said member is positioned opposite to and in face-to-face relation with the slotted side contours 19b, 19b' of the stationary members 19, 19', so that the feeding tube 4 can be clamped between them by the clockwise rotation of the clamping shaft 71. In order to rotate the clamping shaft 71, a pinion 22 is securely mounted on its shaft between the two stationary clamping members 19, 19', and a rack shaft 21 provided with a rack that meshes with the pinion at its one end is slidably supported at its central portion rectangular to the clamping shaft 71 into a hole 30. The said rack shaft has a slot and its engaging pin not shown in the figure is only able to slide and not rotate. The other end of rack shaft 21 mounts slidably a sliding member 31 having a slot on its outer surface through a spring 33 set between the shoulder portion of the rack shaft and the said member. On the other hand, one end of a two-forked lever 24, the actuating lever for the rack shaft, which is pivoted by a pin 26 fixed on a bracket 25 projecting to the interior of housing 13, has a pin engaged with the outer surface slot of sliding member 31, and the other end of the said lever has a cam follower 27 engaged with a cam 28 securely mounted on the said cam shaft 18. A spring 29 is provided for making the cam follower engage with the cam 28 by pressure. It is therefore able to make the rack shaft 21 slide right and left according to the leading of the cam due to the rotation of the cam shaft, and also to make the movable clamping member rotate clockwise and counterclockwise through the pinion 22. In the instant case, by its clockwise rotation the feeding tube 4 is clamped at its specified feeding position, and by its counterclockwise rotation the clamping is released as shown in FIG. 3 (a), in which case the feeding tube slides on a guide plate 23 and is discharged in a receptacle 34 for used-up feeder tube. Further, the upper portion of pinion 22 is notched so as not to interfere with the movement of feeder tube, and a compressive spring 33 mounted on the rack shaft takes the role of giving a clamping force to the movable clamping member 20 as well as compensating for the movement of the size deviation due to feeder tubes.

Next, the construction of the first transmitting means of bar is explained referring to FIGS. 4 and 5. Close to the rear end of the feeder tube 4, clamped at its feeding position and on its extended line, a guide tube 35 housing a pushing rod 46 for feeding the bar is securely mounted on a transmitting frame 47 unified with the housing 13 as one body through several holders 36 for said guide tube and supports 37. A longitudinal slot is machined of the upper portion of said tube along the length of the tube and a fin 38 secured on the pushing rod 46 protrudes through said slot with idle chearance. On the other hand, on the upper position of guide tube 35 an endless chain transmitting mechanism is provided along the axial line of the guide tube. At the front end thereof a driving sprocket wheel 41 and at the rear end thereof a driven sprocket wheel 42 are rotatably mounted on a frame 47 respectively, and a reversible motor 44 is connected directly to the shaft of the driving sprocket. An endless chain 43 is mounted between both sprockets, and on a part of the under side of the chain the transmitting member 38 is connected by connecting pins 39, 39'. At the inner side of both sprockets and close to each sprocket, limit switches 48, 48' are fixed on the frame 47, and on the inner side of each said switch, levers 49, 49' are provided for actuating the said switches, these switches being closed when the stop pin 40 secured on the transmitting member 38 hits against the levers. Therefore, when the driving sprocket rotates clockwise, the pushing rod 46 proceeds along the inside of guide tube 35 and pushes the rear end of finger 6 that meshes with a bar housed in the feeder tube 4, making it possible to position the front end of bar at the roller of the second transmitting means (to be mentioned later). By the starting action of this second transmitting means the sprockets perform simultaneously in a reverse movement to pull back the pushing rod to the most rear end position. The distance between the actuating levers 49, 49' specifies this transmission amount. These transmitting mechanisms are well known, but since in the feeder of this invention they are applied as the first transmitting means and not to perform feed strokes for repeating machining cycles for each workpiece as in the prior art, the amount of transmission will be minimal enabling the feeder to be minimized and compact.

Figure 9:
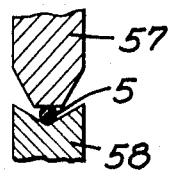
FIG. 9 is a drawing showing the details of the feed roller.

Lastly, the second transmitting means of the bar is explained, referring to FIGS. 6, 7, 8, and 9. As mentioned above, in this invention, in order to restrict the deflection of fine bar material to be fed to the minimum, the said mechanism is mounted on a bracket frame 50 fixed as one body with the foremost front portion of housing 13 for the purpose of obtaining the shortest distance between the point where the action of transmitting force takes place and the position of the jig of the automatic bar machine where the feed resistance is produced (cf. FIG. 1). The main part of the second transmission means consists of one pair of rollers 57, 58 and the central position between rollers coincides with the bar feed center. The details of cross-sectional shape of said rollers is as shown in FIG. 9, said shape being an adequate form to bear wear and to constantly hold the bar at the specified position. The said rollers are securely arranged on roller shafts 68, 69 rotatably mounted on levers 55, 56 each symmetrically formed against the feed center through respective bushes. Also a driven sprocket wheel 66 is securely mounted on the opposite side of the lower roller shaft 69 through lever 56. A chain 70 is equipped between this driven sprocket wheel and a driving sprocket wheel 65 provided in correspondence with the former one. By the driving action of a reversible motor 67, the bar material 5 held between the upper and lower rollers 57, 58 is sent out and pulled back. On the other hand, the left ends of upper and lower levers 55, 56 are fixed to the upper and lower pivoting shafts 53, 54 respectively, and the said shafts are rotatably supported on the frame 50 through sleeves 51, 52 and bushes respectively, while on the other ends of the shafts are fixed respective gears having the same size and teeth pitches meshed with each other. Further, at the front end of lower pivoting shaft 54, a lever 60 for opening and closing the rollers is securely fixed, and at the front end of the said lever arm is pivotally mounted a connecting rod 62 to be connected with a solenoid 62. Therefore, when the solenoid 62 is energized by receiving a signal (to be mentioned later) and pushed down, the said lever 60, the upper and lower levers 55, 56 open the space between the rollers 57, 58 upward and downward in the same degree by the movement of gears 63, 64 against the force of tensile spring 59 and releases the bar 5 held between the rollers. When the solenoid 62 is deenergized by another signal, the rollers hold in turn the bar between them by the force of spring 59 and displace the bar by their rotation. In other words, while the bar is being machined, the bar is retained in the chucks of the work spindle of the automatic bar machine, and the rollers release the bar to be freely rotatable. When the displacement of bar is needed, the chucks of work spindle are opened, and the rollers are closed to send out the bar while maintaining it on the center line. When one of the bar materials is used up and ends the repeating machining cycle, the motor 57 rotates reversely under a signal to pull back the remainder in the feeder tube 4 together with the finger block 6.

The construction in this invention described in detail above is operated as follows:

The bar materials to be fed are housed in a feeder tube 4, arranged on the inclined magazine chute 2, and one of the bars at the lowest position falls down in the slot of drum 9 to be ready for successive feeding. At the time of feeding, the feeder tube 4 in the slot of drum 9 is shifted together with the rotation of the drum, and is fed on a stationary clamping member 19 at the clamp position of the tube, and clamped between a movable clamping member 20. In the meantime, the drum that has completed the feeding of the tube rotates and stops when returned to its original position. These actions are transmitted from the cam shafts 18 equipped at two places at the front and rear portions below the magazine chute 2 to the rotary shaft 10, and the clamping and discharging actions of tube 4 are transmitted by means of rack 21 and pinion 22. When one cycle of these actions is completed as indicated by one rotation of cam shafts 18, a signal for the next sequential action to start is sent. When the signal of completion of one cycle of the cam shafts is sent, the bar material pushing rod 46 provided at the rearmost portion of main body proceeds through the chain 43, and sends out the bar material 5 in the feeding tube 4 between the feed rollers 57, 58 mounted at the front portion of the main body. When the action up to this step has been finished, the chain 43 is driven reversely by a signal of stop pin 40 that has been proceeding with the pushing rod 46, and this rod returns to its original position and stops. Next, by a signal from the switch, provided near the input side of feed rollers not shown in the figure, when the transmitting rod comes to the most forward position, the rollers 57, 58 are closed to hold the bar material 5. The lower roller 58 is rotated by the motor 67 and sends out the bar until the bar strikes against the cutoff bite of the main body of the automatic bar machine which is used as a bar stop. When the front end of the bar strikes against the cutoff bite, the motor 67 comes to a stop, and the feed rollers open upward and downward relative to each other and release the bar from its grip. At the same time, the spindle chuck of the main body of the automatic bar machine is closed to start the running of the machine. Simultaneously, with the opening of the spindle chuck, after finishing the machining of one product, the upper and lower rollers are closed and the motor 67 is activated, thus repeating the transmitting action. After the bar material repeats its forward movements and a signal initiating discharge of the remainder by a switch near the input side of feed rollers (not shown in the figure) is actuated, the transmitting rollers 57, 58 rotate reversely, send back the finger 6 and the remainder into the feeder tube 4, and send out a signal for supplying a new succeeding feeder tube. By this signal the cam shaft 18 begins its rotation to open the clamping member 20, and the remainder containing feeder tube 4 is discharged in the discharged tube receptacle 34, the drum 9 being rotated at the same time to supply a new feeder tube, these actions being repeated in succession.

In the above, the function of this invention has been outlined. Since, as mentioned above, the distance between the roller portion which gives the transmitting force and the jig-mounted portion producing the resistance of feeding is restricted at the shortest end of the bar, and is kept at a definite value irrespective of such length of bar, it is a characteristic of this device that the deflection caused in the bar material is also kept within a definite minimum value, resulting in a reliable and smooth movement in spite of the variation of the unmachined bar length throughout the operation. Moreover, there is no need of a conventional complicated mechanism for engaging and disengaging the finger clamp in pulling back the remainder. Since the bar material is treated as a cartridge by being put into a feeder tube, and is steadily carried out to take out the bar from the magazine chute, especially in case of a small diameter bar (below 0.8 mm.) easily bent or deflected, this feeder device functions very effectively, and can, in addition, be constructed simply and at low cost. Therefore, the bar materials of small diameter and large length that have hitherto been unable to be treated by a conventional automatic bar machine can be fed as well with particular advantages.

Other modes of application of the principle of this invention may be available, changes being made as regards the details described above, provided the features stated in the following claim, or the equivalent of such, is employed.

What is claimed is:

1. A fine bar feeder for an automatic bar machine comprising, a supporting frame, means on said frame to automatically shift bar material from a magazine chute to a feeding position, said bar material being fitted with a finger block at its rear portion and being housed in a feeder tube to form a cartridge, a first transmitting means, said first transmitting means having a pusher rod that pushes the said rear portion of the bar through the finger block, a second transmitting means, said second transmitting having feed rollers mounted on the front end portion of said frame whereby the pusher rod pushes the bar material to a forward position such that the feed rollers then become operative to feed the bar to the bar machine and when the bar has been machined, to reverse the direction of said rollers to discharge the remaining unused portion of the bar.

* * * * *